United States Patent
Bunting et al.

(10) Patent No.: US 10,974,327 B1
(45) Date of Patent: Apr. 13, 2021

(54) DRILLS AND DRILL BITS WITH BUTTRESSED CHIP BREAKERS

(71) Applicant: Facet Precision Tool GmbH, Ganderkesee (DE)

(72) Inventors: Jeremy W. Bunting, Ganderkesee (DE); John A. Bunting, Provo, UT (US)

(73) Assignee: Facet Precision Tool GmbH, Ganderkesee (DE)

( * ) Notice: Subject to any disclaimer, the term of this patent is extended or adjusted under 35 U.S.C. 154(b) by 0 days.

(21) Appl. No.: 16/671,062

(22) Filed: Oct. 31, 2019

(51) Int. Cl.
*B23B 51/02* (2006.01)

(52) U.S. Cl.
CPC .......... *B23B 51/02* (2013.01); *B23B 2226/31* (2013.01); *B23B 2251/085* (2013.01); *B23B 2251/12* (2013.01); *B23B 2251/14* (2013.01)

(58) Field of Classification Search
CPC .............. B23B 51/02; B23B 2251/085; B23B 2251/48; B23B 2251/14; B23B 2251/12; B23B 2200/204; B23C 2210/086; B23C 2200/205
See application file for complete search history.

(56) References Cited

U.S. PATENT DOCUMENTS

| | | | |
|---|---|---|---|
| 3,333,489 A * | 8/1967 | Mossberg | B23B 51/06 408/60 |
| 3,460,409 A | 8/1969 | Stokey | |
| 4,762,445 A | 8/1988 | Bunting et al. | |
| 5,160,232 A | 11/1992 | Maier | |
| 5,688,081 A * | 11/1997 | Paya | B23B 27/141 407/115 |
| 5,873,683 A | 2/1999 | Krenzer | |
| 6,200,077 B1 * | 3/2001 | Svenningsson | B23B 51/048 407/113 |
| 6,213,692 B1 | 4/2001 | Guehring et al. | |
| 6,565,296 B2 | 5/2003 | McKinley et al. | |
| 7,575,401 B1 | 8/2009 | Garrick et al. | |
| 8,556,546 B2 * | 10/2013 | Smilovici | B23C 5/202 407/42 |

(Continued)

FOREIGN PATENT DOCUMENTS

| | | | |
|---|---|---|---|
| DE | 3730377 | 7/1997 | |
| DE | 102010021212 A1 * | 11/2011 | B23B 51/02 |

(Continued)

OTHER PUBLICATIONS

DE3730377, Jul. 10, 1997, Maier, Machine Translation.
DE102017105181, Sep. 13, 2018, Bunting, Machine Translation.

*Primary Examiner* — Ryan C Rufo
(74) *Attorney, Agent, or Firm* — Matthew D. Thayne; Thayne and Davis LLC

(57) ABSTRACT

Drilling tools and/or drill bits having notches with buttressed regions and/or notches therewithin to improve notch strength. In some embodiments, the drill/drill bit may comprise a shank comprising a cutting face, the cutting face terminating in a cutting edge. A notch may be formed along the cutting edge, which may be configured to separate chips formed by the drilling tool during operation. A buttressed region may be formed within the notch and may terminate along the cutting edge. The buttressed region may expand a size of the notch in one or more dimensions.

18 Claims, 6 Drawing Sheets

(56) References Cited

U.S. PATENT DOCUMENTS

| | | | | |
|---|---|---|---|---|
| 8,740,516 | B2 * | 6/2014 | Yoshiba | B23G 5/04 |
| | | | | 408/220 |
| 9,937,566 | B2 * | 4/2018 | Chang | B23B 51/02 |
| 10,005,137 | B2 | 6/2018 | Lee | |
| 10,029,316 | B2 | 7/2018 | Dyer et al. | |
| 10,155,270 | B2 * | 12/2018 | Aso | B23C 5/207 |
| 2002/0141839 | A1 * | 10/2002 | McKinley | B23B 51/0009 |
| | | | | 408/224 |
| 2004/0109733 | A1 * | 6/2004 | Fouquer | B23B 27/065 |
| | | | | 407/113 |
| 2004/0223823 | A1 * | 11/2004 | Mast | B23B 51/0009 |
| | | | | 408/227 |
| 2007/0098506 | A1 * | 5/2007 | Flynn | B23C 5/10 |
| | | | | 407/53 |
| 2011/0081210 | A1 * | 4/2011 | Ishida | B23C 5/207 |
| | | | | 407/42 |
| 2017/0274461 | A1 * | 9/2017 | Mabuchi | B23B 51/00 |

FOREIGN PATENT DOCUMENTS

| | | | | |
|---|---|---|---|---|
| DE | 102017105181 | | 9/2018 | |
| GB | 2201910 A | * | 9/1988 | B23B 51/02 |
| JP | 58177203 A | * | 10/1983 | B23D 61/021 |
| JP | 10109210 A | * | 4/1998 | |
| JP | 10328918 A | * | 12/1998 | |
| JP | 11197921 A | * | 7/1999 | |
| WO | WO-2013080838 A1 | * | 6/2013 | B23C 5/06 |

* cited by examiner

DRILLS AND DRILL BITS WITH BUTTRESSED CHIP BREAKERS

SUMMARY

Embodiments of various drilling tools, such as drill bits, are disclosed herein, that are configured with chip-breaking notches formed with unique features configured to improve the strength of the notches to, for example, allow for use of materials that might otherwise fail during use.

Lightweight carbon fiber composites are widely used in modern airframes to reduce aircraft weight and improve aerodynamic performance. The composite is often used as a skin over a metal frame with the two materials fasten together by first drilling holes through both the composite and the metal frame and then using a metal fastener to fix the two materials together.

The fit between the drilled hole and the metal fastener impacts the mechanical properties of the combined materials, making it important that the two materials have a precision fit between the hole and the fastener with the diameter match within plus or minus twenty microns. PCD drills have been found to be ideal for drilling composites as well as combination of composite and metal airframes due to the abrasive nature of composite materials and the ability of the drills to hold tight tolerances in dissimilar materials.

However, one of the issues with PCD drills is a problem with chip control in drilling these materials. When the direction of drilling is such that the drill first enters the composite and then the metal layer, the metal cutting swarf generated from the drilling process must exit through the composite layer often resulting in oversizing the hole in the composite layer and creating an out of tolerance condition. This is especially true when drilling metals such as Titanium wherein the swarf or chip is fairly stiff.

One way to minimize the effects of the metal swarf is to provide small asymmetrical notches in the cutting edge of the drill. The notches act to break the chips into smaller pieces that can more easily transit the composite layer though the drill flutes without creating an oversized condition. However, such solutions fail or greatly limit the performance when incorporated in the design of PCD drills and/or other drills having similar materials due to the brittle nature of polycrystalline diamond or other similar materials.

More specifically, the use of asymmetrical notches in PCD drills was not possible, as the cutting forces on the edges of the notches would cause the PCD drill to chip and fail. The present inventors have therefore determined that it would be desirable to provide apparatus and methods that overcome one or more of the foregoing limitations and/or other limitations of the prior art. In some embodiments, the inventive concepts disclosed herein may therefore provide a buttressed region that may lead into the cutting edge(s) of the notch(es). This region may transition between the rake face and the cutting edge of each notch to distribute the cutting forces over the buttressed region, thereby strengthening the notch and improving the strength of the resulting cutting edge.

In some embodiments, buttressed notches, such as asymmetrical buttressed notches, may be added to the drill cutting edge by, for example, laser, electrical discharge grinding (EDG), or by traditional grinding processes. The depth of the notches may be calculated according to the projected feed rate of the drilling, which may be sufficient to allow a depth of cut of between, for example, about 25 to about 50 microns without the bottom on the notch being in contact with the material. The spacing of the notches may be positioned such that a cutting edge will overlap the area of the cutting edge removed by the placement of the notches.

Any number of asymmetrical buttressed notches can be added as desired. Preferably, however, at least a portion of one of the cutting edges is engaged by the material to be cut. Typically, only two or three buttressed notches are necessary to create the desired control of the swarf exiting from the hole.

In airframe fabrication, drilling equipment is commonly used to fix the composite plane skin to metal elements, such as spars, ribs, doorframes, and window frames which are typically made from Aluminum or Titanium. In some implementations, the drill bit may be introduced from the exterior of the airframe, thereby contacting and entering a thin layer of carbon-fiber composite by, for example, 5-10 mm while rotating a cutting speeds of, for example, from 600 to 6000 rpms and feed rates of 50 to 300 microns per revolution depending upon the layer of material beneath the composite skin. While the swarf from the carbon-fiber composite is a fine power, the swarf from the metal layer consists of a variety of curved chips depending upon variables used in the drilling process.

The exiting metal chips, depending upon their size and configuration, can enlarge the hole in the softer composite layer as they exit up the drill flutes out of the hole being forced between the drill flute and the wall of the composite hole. Smaller chips can more easily exit the hole and thus are less likely to damage the composite layer, thereby avoiding an out of round condition and/or oversized hole.

One way to create smaller chips is to use a peck cycle to break the metal chips. Peck cycles are where the drill is lifted off the material and then positioned back on the material, which interrupts the drilling process. While one way to create very small chips would be to increase the frequency of the peck, this would greatly increase the cycle time needed to compete the drilling process. Thus, it may be preferred to use one or elements and/or features of the drill design to create smaller more manageable chips.

As those of ordinary skill in the art will appreciate, the width of a chip is correlated to the width of the cutting edge. Adding a notch to the cutting edge can split a chip into two separate chips with a reduced width. The change in width in turn influences the way the chip forms and reduces the difficulty the chip has in transiting out of the hole.

Thus, the present inventors have found that, by adding buttressed notches to the drill cutting edges within the PCD or other more brittle material for drills having inlays, it may be possible to consistently drill holes within a tolerance of plus or minus twenty microns.

In a more specific example of a drilling tool, such as a drill bit, according to some embodiments, the drilling tool may comprise a shank comprising a cutting face. The cutting face may terminate in one or more cutting edges. One or more notches may be formed along the cutting edge(s). The notch(es) may be configured to separate chips formed by the drilling tool during operation. One or more of the notches may comprise a cutout or buttressed region formed within the notch. This region may terminate along the cutting edge and may expand a size of the notch in one or more dimensions, such as width and/or depth.

In some embodiments, the drilling tool may comprise a polycrystalline diamond material, which may, in some such embodiments, only comprise a portion of the material making up the drilling tool. In some such embodiments, the notch may be wholly formed with the polycrystalline material of the drilling tool.

In some embodiments, the buttressed region may define, or at least substantially define, a V-shape or, alternatively, a U-shape, in cross-section.

In some embodiments, the buttressed region may comprise a depth and/or width that is greater than a corresponding depth/width of the adjacent region of the notch, the width being defined between opposing sides of the adjacent cutting edge.

Some embodiments may comprise a secondary edge defining a boundary and/or cutting edge between the notch and the buttressed region. The secondary cutting edge may be spaced apart from the cutting face that may, in some embodiments, define a boundary between a "notch within a notch" of sorts. In some embodiments, this boundary may be curved and may therefore define a curved surface extending between the notch and the buttressed region.

In some embodiments, the secondary/cutting edge may spaced apart from the cutting face by a distance of between about 5 and about 50 microns.

In some embodiments, the buttressed region may be spaced apart from a cutting face of the tool by a distance of between about 5 and about 50 microns.

In another example of a drilling tool according to other embodiments, the tool may comprise a shank comprising a cutting face, the cutting face terminating in a cutting edge. A notch may be formed along the cutting edge, which notch may be configured to separate chips formed by the drilling tool during operation. The notch may comprise a first region positioned immediately adjacent to the cutting edge and a second region positioned adjacent to the first region. The first region may extend deeper into the cutting edge than the second region. In some embodiments, a secondary edge may define a boundary between the first region and the second region.

Preferably, the first region is configured to distribute cutting forces experienced by the second region along the first region during a drilling operation with the drilling tool to improve the strength of the notch.

The first region may comprise a width that is greater than a width of the second region.

In some embodiments, the first region may comprise a surface that extends away from a surface of the second region at an angle of between about 5 degrees and about 45 degrees.

In an example of a drill bit according to some embodiments, the drill bit may comprise a shank extending along a central axis. The shank may comprise a first cutting face and a second cutting face. The first cutting face may terminate in a first cutting edge, and the second cutting face may terminate in a second cutting edge. A first notch may be formed along the first cutting edge, which may comprise a first region positioned immediately adjacent to the first cutting edge and a second region positioned adjacent to the first region. At least a portion of the first region of the first notch may be angled away from the first region of the first notch, at least in part, to define a greater notch depth along at least a portion of the first region of the first notch than the second region of the first notch.

Similarly, a second notch may be formed along the second cutting edge. The second notch may be formed at a different distance from the central axis than the first notch and may comprise a first region positioned immediately adjacent to the second cutting edge and a second region positioned adjacent to the first region. At least a portion of the first region of the second notch may be angled away from the first region of the second notch, at least in part, to define a greater notch depth along at least a portion of the first region of the second notch than the second region of the second notch.

In some embodiments, the first region of the first notch may also be wider than the second region of the first notch. Similarly, the first region of the second notch may be wider than the second region of the second notch.

In some embodiments, the first region of the first notch may be deeper than the second region of the first notch along the entire first region of the first notch. Similarly, the first region of the second notch may be deeper than the second region of the second notch along the entire first region of the second notch.

Some embodiments may comprise a secondary edge defining a boundary between the first region and the second region of the first notch and/or defining a boundary between the first region and the second region of the second notch.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
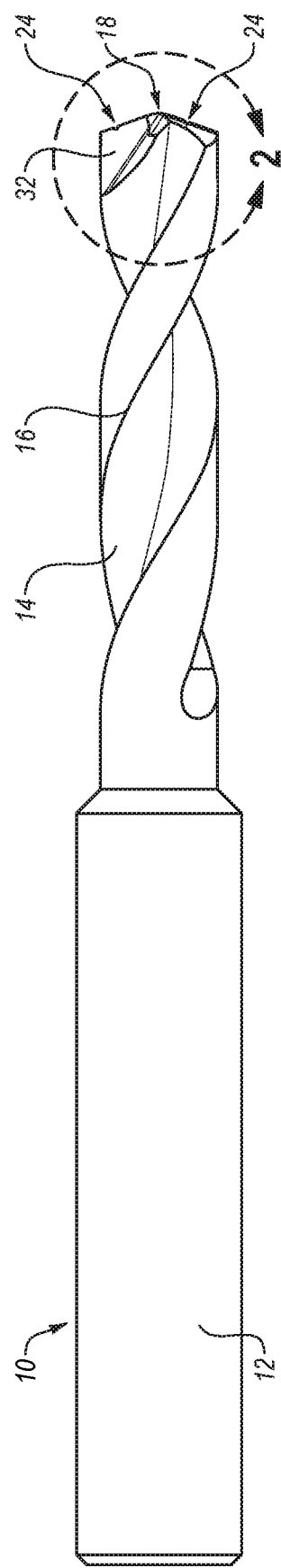
FIG. 1 depicts a drill bit according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/ perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts a drill 10 according to some embodiments. Drill 10 may comprise, at least in part, a polycrystalline diamond material and/or a cubic boron nitride material, which material may be present in the form of one or more inlays and/or veins of such material, as those of ordinary skill in the art will appreciate. Drill 10 may, for example, be specifically configured for use in airframe manufacturing and may comprise a drill shank 12 and a fluted portion 14, which may comprise various lands 16, a tip 18, and a face rake 32. One or more (preferably at least two) notches 24 may also be formed along a distal portion of drill 10, such as along one or more cutting edges 20. As described in greater detail below, notches 24 may comprise buttressed regions that may comprise a "notch within a notch" of sorts. Such features of notches 24 may be configured to improve the strength of the notch by, for example, spreading the cutting forces throughout the buttressed region of the notch 24, which may allow for use of chip-splitting notches in relatively brittle materials, such as polycrystalline diamond and/or a cubic boron nitride materials, which may otherwise be susceptible to damage due to the concentrated cutting forces within such chip-breaking notches.

Figure 2:
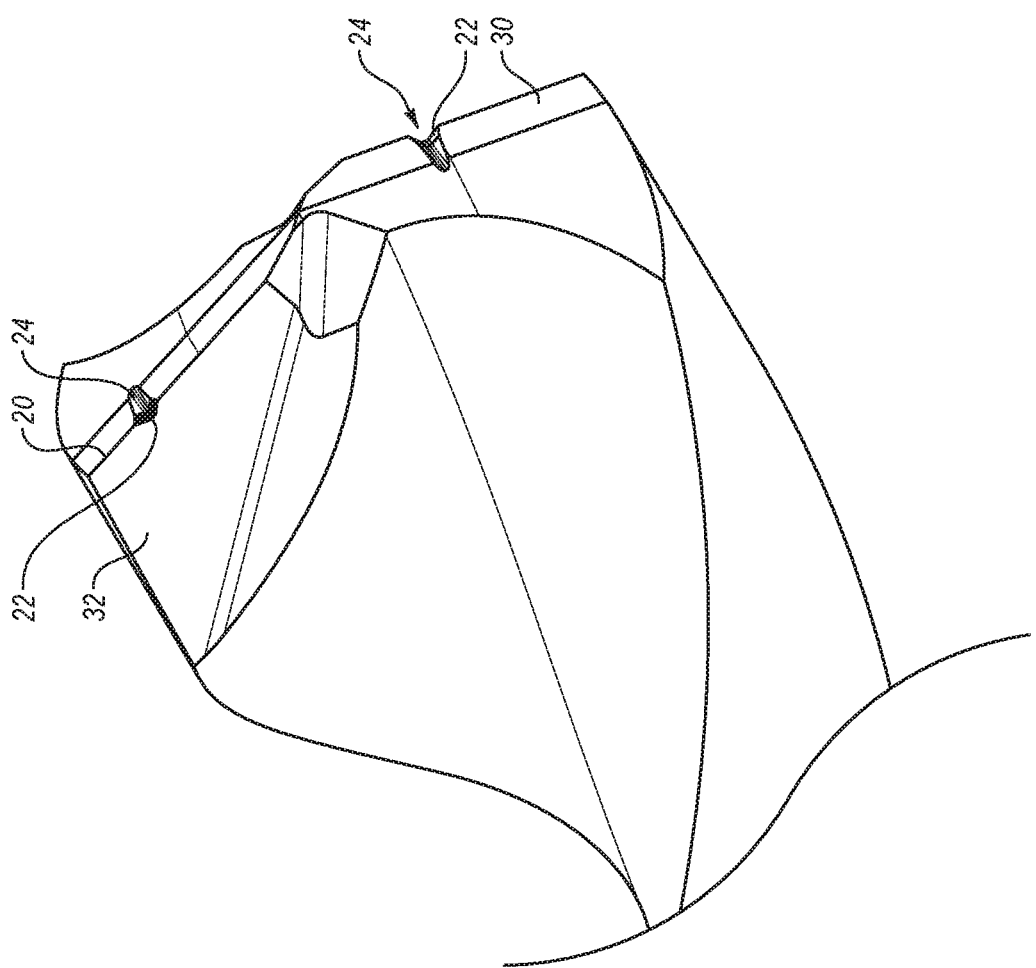
FIG. 2 is an enlarged view of a tip of the drill bit of FIG. 1.

FIG. 2 provides a more detailed view of the buttressed notch 24 positioned in two opposing cutting edges 20 of the drill 10 adjacent to a primary clearance region 30.

Figure 3:
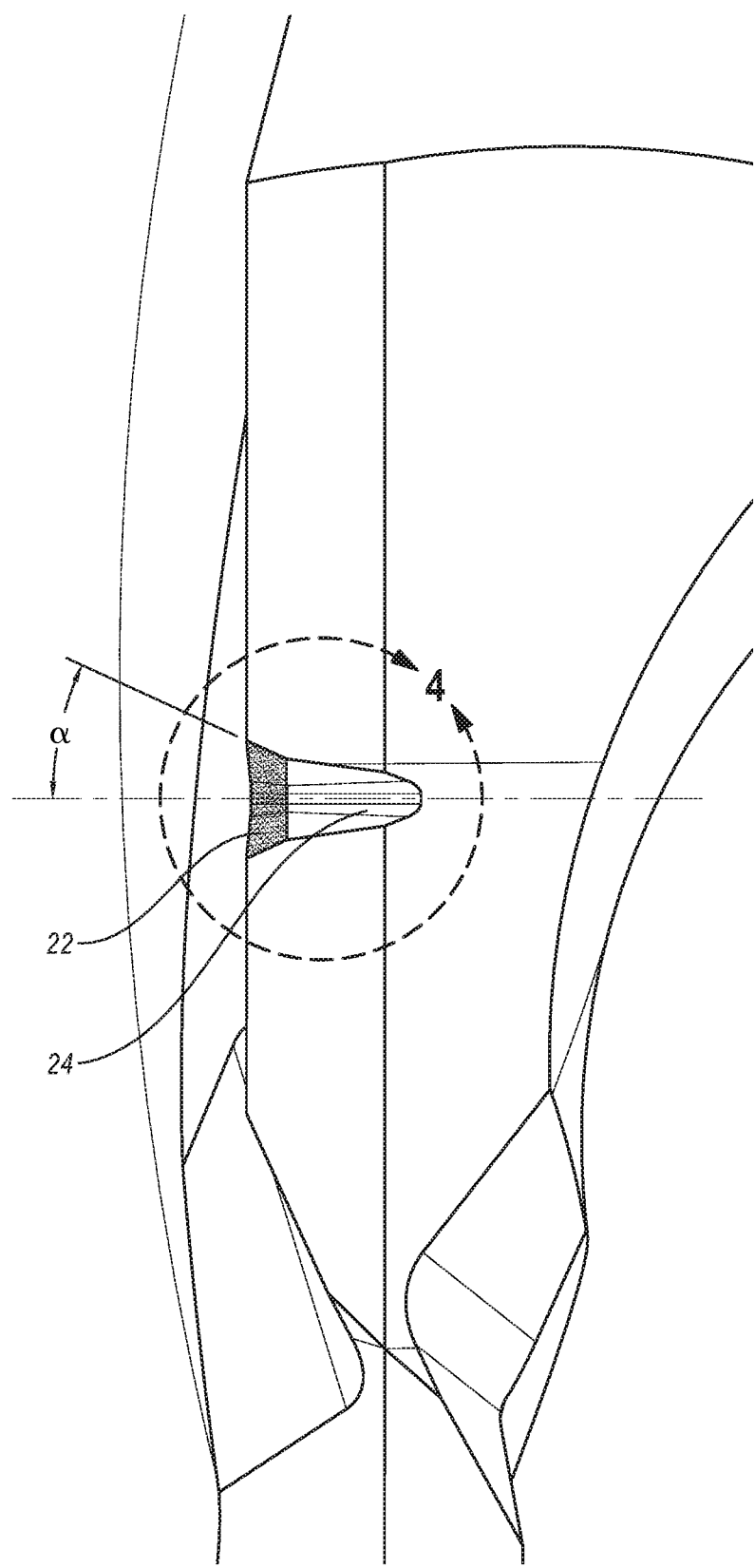
FIG. 3 depicts one of the buttressed notches of the drill bit.

FIG. 3 is an enlarged view of one of the notches 24 to better illustrate the buttressed region 22 of notch 24. From this view, it can be seen that notch 24 is wider as it traverses the cutting edge relief of the drill 10, thereby providing a clearance angle for the notch cutting edges. The clearance angle should be at least sufficient to provide a primary clearance for the cutting edge of the notch. In preferred embodiments, this angle may be between about 3 degrees and about 5 degrees. However, it should be understood that the present disclosure is not limited to any particular drill point angle, nor any specific number of flutes. In addition, it is contemplated that the rake face may vary, such as being either straight or concave, for example.

Figure 4:
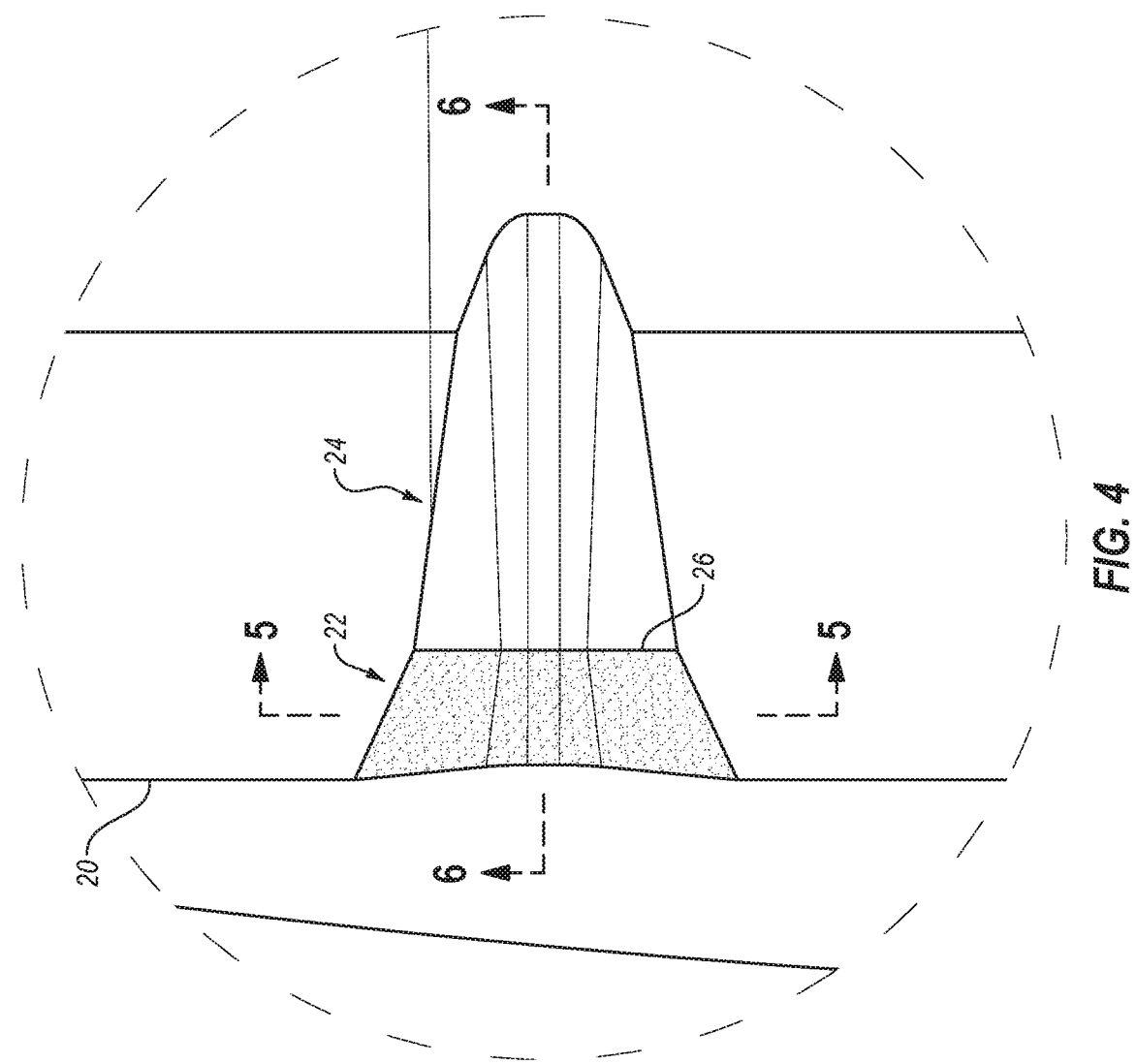
FIG. 4 is an enlarged view of the buttressed notch of FIG. 3.

FIG. 4 better illustrates a transitional and/or notch cutting edge 26 between buttressed region 22 of notch 24 adjacent to cutting edge 20 and the adjacent portion of notch 24 that, absent region 22, would extend to cutting edge 20 and would comprise a traditional chip-breaking notch. Edge 26 may comprise a sharp edge in some embodiments or, alternatively, may be rounded in other embodiments.

Figure 5:
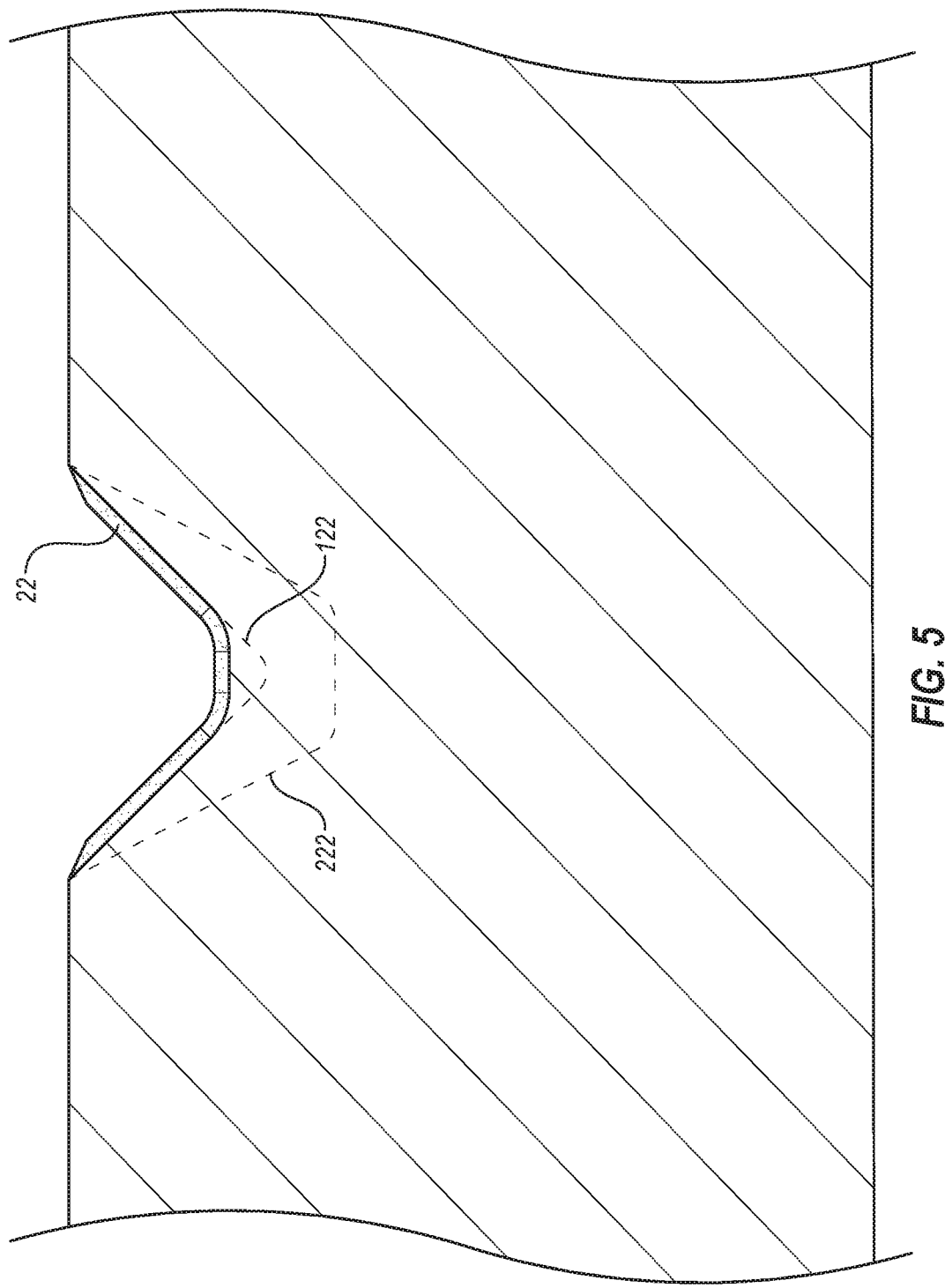
FIG. 5 is a cross-sectional view taken along line 5-5 in FIG. 4.

In addition, as shown in the cross-sectional view of FIG. 5, the shape of the notch 24, including the buttressed region 22 and/or the traditional region of notch 24 adjacent to buttressed region 22, may vary. For example, notch 24 may be at least generally in the shape of the letter U with a relatively flat region in the center connecting two opposing side walls, as shown in FIG. 5. Alternatively, notch 24 may comprise more of a V-shape, as indicated at 122, or a U shape having non-rounded corners, as indicated at 222. A variety of other notch shapes are also contemplated, such as a semi-circle or any buttressed notch shape added to the cutting edge that will effective reduce the width of the chips formed by the cutting edge.

The width of the notch 24 at its widest point along the cutting edge may be any suitable length. Preferably, however, at least one of the cutting edges is always engaged with the material to be cut. It is preferred that the width be as small as practical and still effect a break in the width of the resulting chip. In some particularly preferred embodiments, the widest point of the notch may be between about 0.2 mm and about 0.5 mm and the deepest depth of the notch may be at least about 0.1 mm (at least greater than the depth of the cut).

In some embodiments, the buttressed region 22 may be between about 5 and about 50 microns deep and may be define, at least in part, by a negative angle α, which may be between about 5 degrees and about 45 degrees to distribute the cutting forces along the edge of the notch 24. More preferably, the buttressed region 22 may be about negative 10 degrees and may comprise a depth of about 20 microns.

Figure 6:
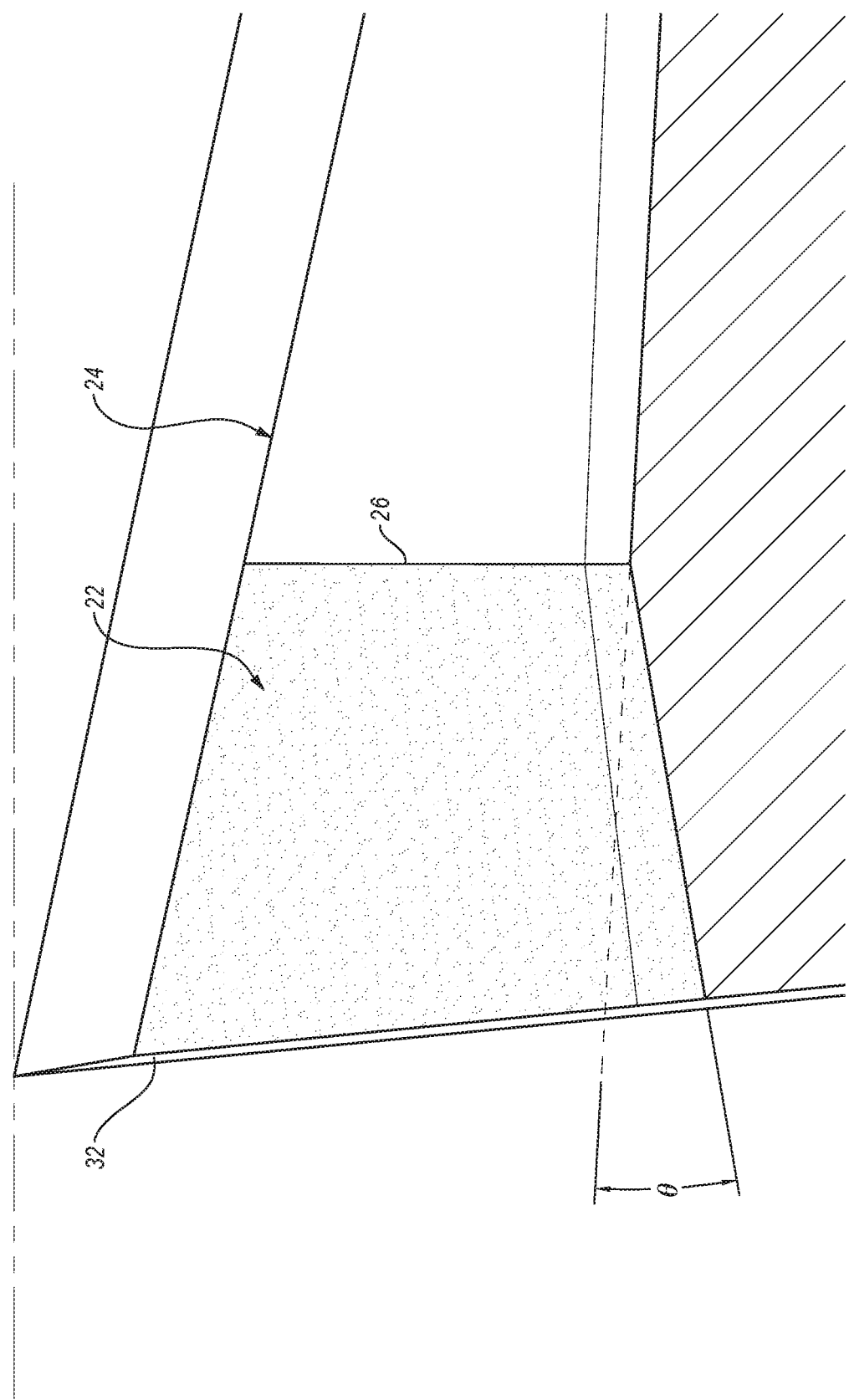
FIG. 6 is a cross-sectional view taken along line 6-6 in FIG. 4.

As shown in FIG. 6, secondary cutting edge/boundary 26 may define an angle θ to provide clearance for cutting by edge 26, which angle θ may be between about 5 degrees and about 45 degrees (negative to provide clearance) in some preferred embodiments.

It will be understood by those having skill in the art that changes may be made to the details of the above-described embodiments without departing from the underlying principles presented herein. Any suitable combination of various embodiments, or the features thereof, is contemplated.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined only by the following claims.

The invention claimed is:

1. A drilling tool, comprising:
a shank comprising a cutting face and a clearance surface, the cutting face terminating in a cutting edge;
a notch formed within the clearance surface and intersecting the cutting edge, wherein the notch is configured to separate chips formed by the drilling tool during operation;
a buttressed region formed and wholly contained within the notch, the buttressed region defined by a buttressed surface forming a negative clearance angle, wherein the only negative clearance angle on the drilling tool is within the buttressed region; and
a secondary edge defining a boundary between the buttressed region and the notch outside of the buttressed region, wherein the notch outside of the buttressed region is defined by a surface forming a positive clearance angle, wherein the buttressed region terminates at the cutting edge, wherein the buttressed region expands a size of the notch in at least one dimension, and wherein the buttressed region comprises a width defined between opposing sides of the cutting edge that is greater than a width of the notch outside of the buttressed region.

2. The drilling tool of claim 1, wherein the drilling tool comprises a drill bit.

3. The drilling tool of claim 1, wherein the drilling tool comprises a polycrystalline diamond material.

4. The drilling tool of claim 1, wherein the buttressed region substantially defines a V-shape in cross-section.

5. The drilling tool of claim 1, wherein the buttressed region substantially defines a U-shape in cross-section.

6. The drilling tool of claim 1, wherein the buttressed region comprises a depth greater than a depth of the notch outside of the buttressed region.

7. The drilling tool of claim 1, wherein the secondary edge is curved.

8. The drilling tool of claim 1, wherein the buttressed region comprises a depth of between about 5 and about 50 microns.

9. The drilling tool of claim 1, wherein the buttressed region expands a size of the notch in all directions such that every surface defining the buttressed region is formed with negative clearance.

10. A drilling tool, comprising:
a shank comprising a cutting face and a clearance surface, the cutting face terminating in a cutting edge;
a notch formed within the clearance surface and intersecting the cutting edge, wherein the notch is configured to separate chips formed by the drilling tool during operation, and wherein the notch comprises:
a first region wholly contained within the notch and directly connected to the cutting edge, the first region defined by a buttressed surface forming a negative clearance angle, wherein the only negative clearance angle on the drilling tool is within the first region; and
a second region positioned adjacent to the first region, wherein the first region extends to a greater depth relative to the cutting edge than the second region, and wherein the first region comprises a width that is greater than a width of the second region, wherein the second region is defined by a surface forming a positive clearance angle; and
a secondary cutting edge defining a boundary between the first region and the second region, the secondary cutting edge being spaced apart from the cutting face.

11. The drilling tool of claim 10, wherein the first region is configured to distribute cutting forces experienced by the second region along the first region during a drilling operation with the drilling tool to improve the strength of the notch.

12. The drilling tool of claim 10, wherein the secondary cutting edge is spaced apart from the cutting face by a distance of between about 5 and about 50 microns.

13. The drilling tool of claim 10, wherein the buttressed surface extends away from the surface forming the positive clearance angle of the second region at an angle of between 5 degrees and about 45 degrees.

14. The drilling tool of claim 10, wherein, in a plan view of the notch, opposing wall surfaces of the first region are angled outwardly from the secondary cutting edge to the cutting edge such that no surface of the first region is coplanar with an adjacent surface of the second region.

15. A drill bit, comprising:
a shank extending along a central axis, the shank comprising:
a first cutting face and a first clearance surface, the first cutting face and the first clearance surface intersecting at a first cutting edge;
a second cutting face and a second clearance surface, the second cutting face and the second clearance surface intersecting at a second cutting edge; and
a first notch formed within the first clearance surface and intersecting the first cutting edge, a second notch formed within the second clearance surface and intersecting the second cutting edge, the second notch being formed at a different distance from the central axis than the first notch, wherein the each notch comprises:
a first region directly connected to the first cutting edge, the first region of the first notch being bounded by the first cutting edge on opposite sides of the first region of the first notch, the first region defined by a buttressed surface forming a negative clearance angle, wherein the only negative clearance angle on the drilling tool is within the first region; and
a second region positioned adjacent to the first region, wherein the second region is defined by a surface forming a positive clearance angle, wherein the buttressed surface extends away from the surface forming the positive clearance angle of the second region to define a greater notch depth along at least a portion of the first region than the second region, and the first region is wider than of the second region.

16. The drill bit of claim 15, each notch further comprising:
a secondary edge defining a boundary between the first region and the second region.

17. The drill bit of claim 15, wherein the drill bit comprises a polycrystalline diamond material.

18. The drill bit of claim 16, wherein, in a plan view of each notch, opposing wall surfaces of the first region are angled outwardly from the secondary edge such that no surface of the first region is coplanar with an adjacent surface of the second region.

\* \* \* \* \*